(12) United States Patent
Marks et al.

(10) Patent No.: US 11,359,039 B2
(45) Date of Patent: Jun. 14, 2022

(54) POLAR COMONOMER ENCHAINMENT IN OLEFIN POLYMERIZATION REACTIONS

(71) Applicant: Northwestern University, Evanston, IL (US)

(72) Inventors: Tobin J. Marks, Evanston, IL (US); Jiazhen Chen, Evanston, IL (US); Tracy L. Lohr, Houston, TX (US)

(73) Assignee: Northwestern University, Evanston, IL (US)

( * ) Notice: Subject to any disclaimer, the term of this patent is extended or adjusted under 35 U.S.C. 154(b) by 201 days.

(21) Appl. No.: 16/648,526

(22) PCT Filed: Oct. 5, 2018

(86) PCT No.: PCT/US2018/054569
§ 371 (c)(1),
(2) Date: Mar. 18, 2020

(87) PCT Pub. No.: WO2019/071102
PCT Pub. Date: Apr. 11, 2019

(65) Prior Publication Data
US 2020/0223963 A1 Jul. 16, 2020

Related U.S. Application Data

(60) Provisional application No. 62/568,978, filed on Oct. 6, 2017.

(51) Int. Cl.
*C08F 210/02* (2006.01)
*C08F 4/52* (2006.01)
*C08F 4/6192* (2006.01)

(52) U.S. Cl.
CPC .............. *C08F 210/02* (2013.01); *C08F 4/52* (2013.01); *C08F 4/61927* (2013.01); *C08F 2410/03* (2013.01)

(58) Field of Classification Search
CPC ................................ C08F 210/02; C08F 4/32
See application file for complete search history.

(56) References Cited

U.S. PATENT DOCUMENTS 3,293,326 A 12/1966 Jezl et al.
3,476,726 A 11/1969 Giannini
(Continued)

OTHER PUBLICATIONS

Wang et al., "Heteroatom-assisted olefin polymerization by rare-earth metal catalysts," *Sci. Adv.*, Jul. 21, 2017, vol. 3: e1701011, pp. 1-8.
(Continued)

*Primary Examiner* — Catherine S Branch
(74) *Attorney, Agent, or Firm* — Bell & Manning, LLC

(57) ABSTRACT

A method for forming polar-functionalized polyolefins may comprise contacting an unsubstituted α-olefin monomer and an amino-olefin monomer of formula $H_2C=CH(CH_2)_n(CHR)_mNR'_2$, wherein R is H or an unsubstituted linear or branched alkyl group having from 1 to 10 carbons, each R' is an independently selected unsubstituted linear or branched alkyl group having from 1 to 10 carbons, m is an integer from 1 to 11, and n is an integer from 1 to 11, in the presence of a rare earth catalyst and a cocatalyst under conditions to induce a heteropolymerization reaction between the unsubstituted oc-olefin and amino-olefin monomers to provide a polar-functionalized poly olefin.

20 Claims, 13 Drawing Sheets

(56) References Cited

U.S. PATENT DOCUMENTS

| | | | |
|---|---|---|---|
| 3,755,279 | A | 8/1973 | Langer, Jr. et al. |
| 9,284,390 | B2 | 3/2016 | Nozaki et al. |
| 2003/0171508 | A1 | 9/2003 | Brookhart et al. |
| 2006/0178491 | A1 | 8/2006 | Canich |
| 2013/0066029 | A1 | 3/2013 | Radlauer et al. |

OTHER PUBLICATIONS

Chen, Jiazhen, et al. "Scandium-Catalyzed Self-Assisted Polar Co-monomer Enchainment in Ethylene Polymerization." *Angewandte Chemie International Edition* 56.50 (2017): 15964-15968.

The International Search Report and Written Opinion issued for International Patent Application No. PCT/US2018/54569 dated Dec. 27, 2018, pp. 1-7.

Radlauer et al., Bimetallic Coordination insertion Polymerization of Unprotected Polar Monomers: Copolymerization of Amino Olefins and Ethylene by Dinickel Bisphenoxyiminato Catalysts, Journal of the American Chemical Society, Feb. 20, 2013, vol. 135, pp. 3784-3787; p. 3786.

Chen et al., "Metal and Counteranion Nuclearity Effects in Organoscandium-Catalyzed Isoprene Polymerization and Copolymerization," ACS Catalysis, Jul. 6, 2017, vol. 7, pp. 5214-5219; p. 5215, p. 5217.

Kaminsky et al., "Transition Metals and Organometallics as Catalysts for Olefin Polymerization," Springer Science & Business Media, Dec. 6, 2012, pp. 1-442; p. 370.

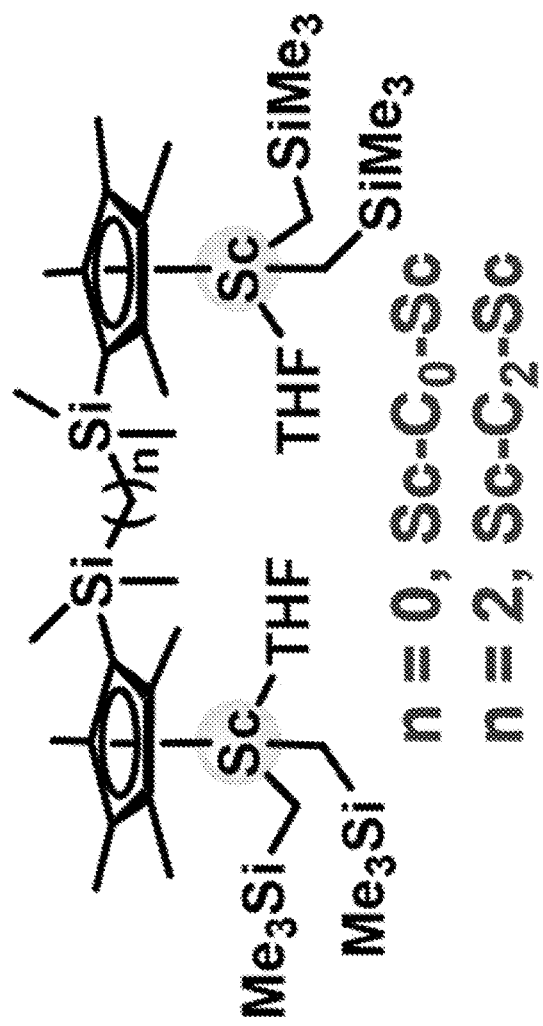
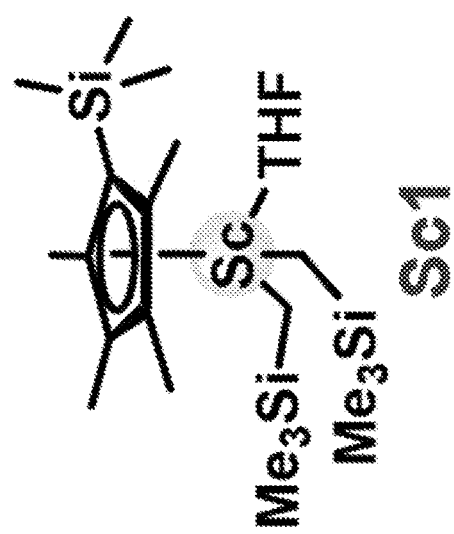
FIG. 1

R = -(CH$_2$)$_n$CH$_3$ (n is an integer in the range of 0 to 10) or -CH$_3$

R = -CH=CH$_2$, -CH(CH$_3$)=CH$_2$, -CH=CH(CH$_2$)$_n$CH$_3$, -CH(CH$_3$)=CH(CH$_2$)$_n$CH$_3$ (n is an integer in the range of 0 to 10)

R = -(CH$_2$)$_n$Ar (n is an integer in the range of 0 to 10, Ar = aryl group)

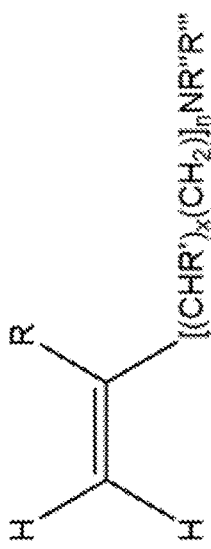

Formula 5 n is an integer in the range of 1 to 11.
x is an integer in the range of 0 to n.

R, R' are independently selected from hydrogen, an alkyl group and an aryl group.
R'', R''' are independently selected from hydrogen and an alkyl group. The alkyl group may be linear, branched or cyclic.

The number of carbon atoms in the alkyl group may be in the range of 1 to 10.
A cyclic alkyl group has three or more carbon atoms.

FIG. 8

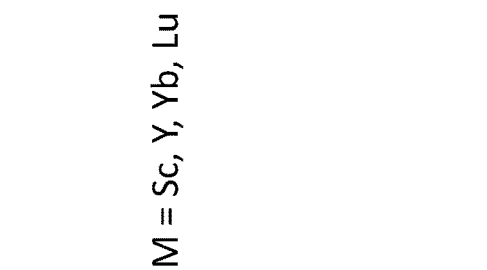
M = Sc, Y, Yb, Lu
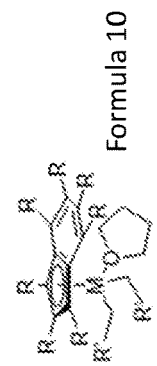
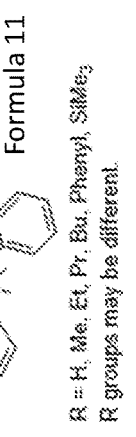
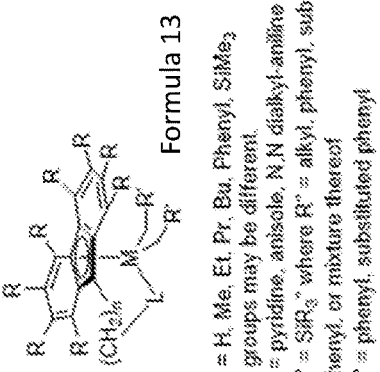
FIG. 9B $[R_3C]^+[BR'_4]^-$ Illustrative example 1: 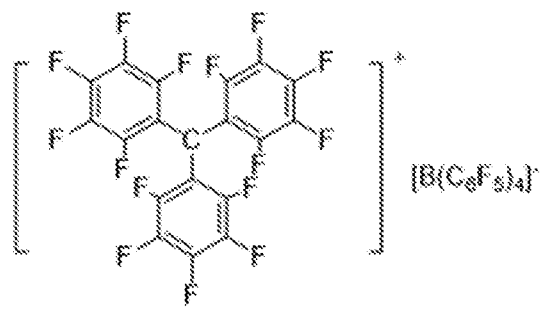
Illustrative example 2: 
$[R''_3NH][BR'_4]^-$ Illustrative example: 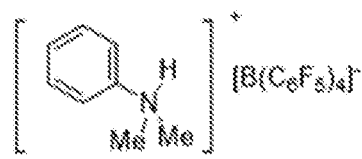
$BR'_3$ Illustrative example: 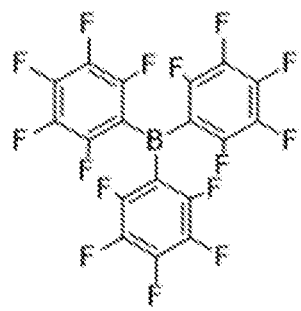
FIG. 10

FIG. 11
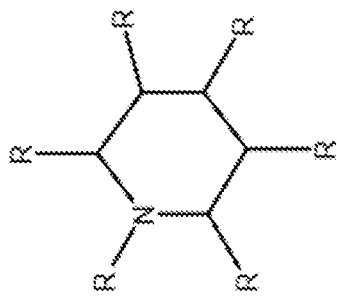
Formula 16
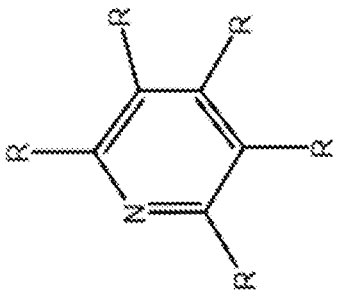
Formula 18
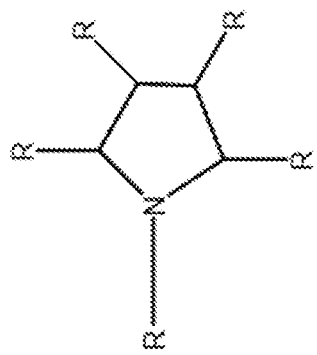
Formula 15
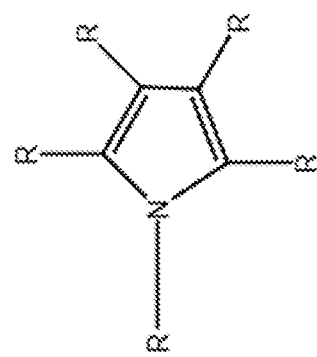
Formula 17

POLAR COMONOMER ENCHAINMENT IN OLEFIN POLYMERIZATION REACTIONS

CROSS-REFERENCE TO RELATED APPLICATIONS

This application is a National Stage of International Application No. PCT/US2018/054569, filed Oct. 5, 2018, which claims the benefit of U.S. Provisional Patent Application No. 62/568,978, filed Oct. 6, 2017, the contents of which are herein incorporated by reference.

REFERENCE TO GOVERNMENT RIGHTS

This invention was made with government support under CHE-1464488 awarded by the National Science Foundation. The government has certain rights in the invention.

BACKGROUND

Polyolefins, including polyethylene (PE) and polypropylene (PP) represent more than half of all commercial polymers produced in the world.[1] Introducing only a small percentage of polar functionality (<2%) into the polyolefin backbone can dramatically enhance adhesion, compatibility with other polymers, and surface properties.[2] Direct coordinative copolymerization of functionalized monomers with non-functionalized olefins is desirable for realizing precise control over such copolymer microstructures.[2c] Conventional d⁰ group 4 metal catalysts are highly oxophilic and deactivated by most polar functional groups.[3] Thus, excess Lewis acidic masking reagents such as MAO (methylaluminoxane) or aluminum alkyls are often required to prevent catalyst poisoning through acid-base pairing, i.e. functional group masking.[4] This greatly reduces process atom efficiency, and complicates rigorous analysis of the polymerization mechanism. In the case of zirconocene/borate catalysts, masking reagent-free polymerizations of amino-olefins afford only polymers with relatively low $M_n$s and at low activity.[5] Current generation less oxophilic late transition metal (Ni, Pd) catalysts exhibit higher tolerance towards polar functionalities,[6] however their activity and thermal stability are limited, and product polymer molecular weights are typically low.[7]

SUMMARY

Provided are methods for forming polar-functionalized polyolefins. The polyolefins formed using these methods are also provided.

In one aspect, methods for forming polar-functionalized polyolefins are provided. In an embodiment, such a method comprises contacting an unsubstituted α-olefin monomer and an amino-olefin monomer of formula $H_2C=CH(CH_2)_n(CHR)_mNR'_2$, wherein R is H or an unsubstituted linear or branched alkyl group having from 1 to 10 carbons, each R' is an independently selected unsubstituted linear or branched alkyl group having from 1 to 10 carbons, m is an integer from 1 to 11, and n is an integer from 1 to 11, in the presence of a rare earth catalyst and a cocatalyst under conditions to induce a heteropolymerization reaction between the unsubstituted α-olefin and amino-olefin monomers to provide a polar-functionalized polyolefin.

In another embodiment a method for forming a polar-functionalized polyolefin comprises contacting an olefin monomer of formula $H_2C=CHR$, wherein R is selected from H and $(CH_2)_nCH_3$, wherein n is an integer between 0 and 10, and an amino-olefin monomer of formula $H_2C=CH(CH_2)_nNR'_2$, wherein each R' is the same linear, unsubstituted alkyl group having from 1 to 10 carbons and n is an integer from 1 to 11, in the presence of a rare earth catalyst and a cocatalyst under conditions to induce a heteropolymerization reaction between the olefin and amino-olefin monomers to provide a polar-functionalized polyolefin, wherein the rare earth catalyst is of Formula 6 or Formula 7,

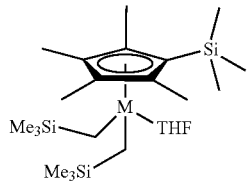

Formula 6

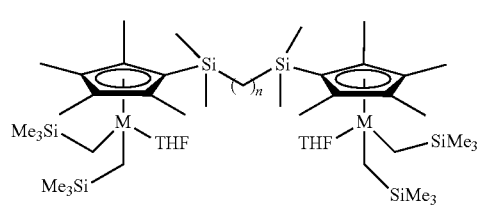

Formula 7 wherein M is selected from Sc, Y, Yb, and Lu and n is 0 or 2.

Other principal features and advantages of the disclosure will become apparent to those skilled in the art upon review of the following drawings, the detailed description, and the appended claims.

BRIEF DESCRIPTION OF THE DRAWINGS

Illustrative embodiments of the disclosure will hereafter be described with reference to the accompanying drawings.

FIG. 1 shows illustrative mono- and binuclear organoscandium catalysts for ethylene+heteroatom-functionalized olefin copolymerization.

FIG. 8 illustrates the scope of amino-olefin comonomers.
FIGS. 9A and 9B illustrate the scope of catalysts.
FIG. 10 illustrates the scope of cocatalysts.
FIG. 11 illustrates the scope of exogenous Lewis bases.

DETAILED DESCRIPTION

Provided are methods for forming polar-functionalized polyolefins. The methods involve the use of rare earth catalysts in the copolymerization of olefin monomers with amino-olefin monomers. Thus, the methods involve heteropolymerization of different types of monomers and are distinguished from homopolymerization of the same type of monomers. Rare earth catalysts are viewed as highly oxophilic and thus, have been overlooked as candidates for polar monomer copolymerization. Compared to conventional methods, at least some embodiments of the present methods are able to provide polar-functionalized polyolefins having significantly greater molecular weights and higher levels of functionalization.

In an embodiment, a method for forming a polar-functionalized polyolefin comprises contacting an olefin monomer and an amino-olefin monomer in the presence of a rare earth catalyst under conditions to induce a polymerization reaction between the olefin and amino-olefin monomers.

The olefin monomer may be a linear or branched α-olefin. The olefin monomer may be unsubstituted. As used herein, the term "unsubstituted" in an unsubstituted group/molecule means containing no heteroatoms (e.g., oxygen, nitrogen, a halogen atom). The term "substituted" in a substituted group/molecule means an unsubstituted group/molecule in which one or more bonds to a carbon(s) or hydrogen(s) are replaced by a bond to non-hydrogen and non-carbon atoms. An unsubstituted group/molecule can be linear or branched.

In embodiments, the olefin monomer has Formula 1, $H_2C=CHR$, wherein R is selected from H and $(CH_2)_nCH_3$, wherein n is an integer between 0 and 10 (including 1, 2, 3, 4, 5, 6, 7, 8, and 9). Illustrative such olefins include ethylene, propylene and 1-dodecene.

Figure 7:
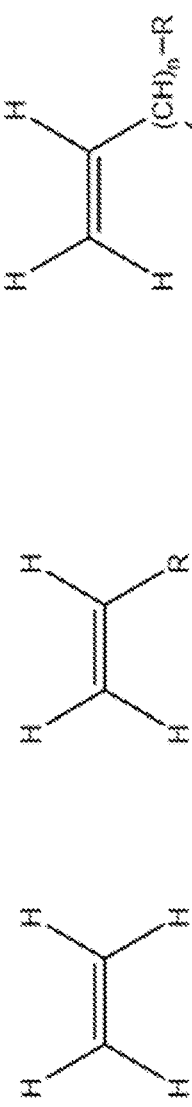
FIG. 7 illustrates the scope of non-functionalized olefins.

Other illustrative olefin monomers include those having Formula 2 or Formula 3, which are shown in FIG. 7 and include dienes. The aryl group referenced in this figure may be unsubstituted or substituted. Illustrative unsubstituted aryl groups include phenyl, benzyl, tolyl, xylyl and naphthyl. The R groups represented in Formulas 2 and 3 may be independently selected from any of the three R groups.

Combinations of different types of olefin monomers may be used in the method.

The amino-olefin provides the polar functional groups in the polyolefin formed using the present methods. The amino-olefin may be an amino-olefin of Formula 4A, $H_2C=CH(CH_2)_n(CHR)_mNR'_2$, wherein R is H or an unsubstituted linear or branched alkyl group having from 1 to 10 carbons (including 2, 3, 4, 5, 6, 7, 8, and 9), each R' is an independently selected unsubstituted linear or branched alkyl group having from 1 to 10 carbons (including 2, 3, 4, 5, 6, 7, 8, and 9), m is an integer from 1 to 11 (including 2, 3, 4, 5, 6, 7, 8, 9, and 10), and n is an integer from 1 to 11 (including 2, 3, 4, 5, 6, 7, 8, 9, and 10). Each R' may be the same alkyl group or different alkyl groups.

The amino-olefin may be an amino-olefin of Formula 4B, $H_2C=CH(CH_2)_nNR'_2$, wherein each R' is an independently selected alkyl group and n is an integer from 1 to 11 (including 2, 3, 4, 5, 6, 7, 8, 9, and 10). Each R' may be the same alkyl group or different alkyl groups. The alkyl group may be a linear or branched, unsubstituted alkyl group. The alkyl group may have from 1 to 10 carbon atoms (including 2, 3, 4, 5, 6, 7, 8, and 9 carbon atoms).

Illustrative amino-olefins also include those used in the Example below. Other illustrative amino-olefins are also shown in FIG. 8 having Formula 5. The alkyl group in Formula 5 may be unsubstituted. The aryl group in Formula 5 may be as defined above. Combinations of different types of amino-olefin comonomers may be used in the method.

Figure 9A:
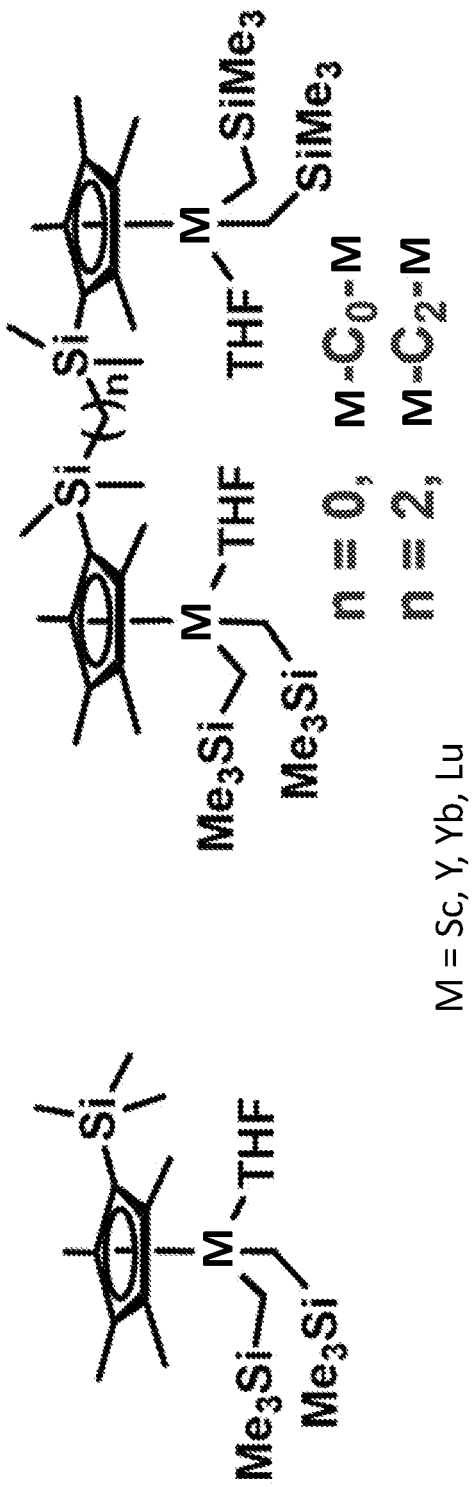

The polymerization reactions between the olefin and amino-olefin monomers are mediated by a rare earth catalyst. The rare earth catalyst is an organometallic complex comprising a rare earth element. Illustrative rare earth elements include Sc, Y, Yb and Lu. The rare earth catalyst may be mononuclear (i.e., having a single rare earth element) or binuclear (i.e., having two rare earth elements). Illustrative rare earth catalysts include those having Formula 6 or Formula 7, shown in FIG. 9A. Other illustrative rare earth catalysts include the mononuclear and binuclear organoscandium catalysts used in the Example below.

Other illustrative rare earth catalysts include those having Formula 8-13 as shown in FIG. 9B. In these formulas, M may be Sc, Y, Yb, or Lu; Me=methyl, Et=ethyl, Pr=propyl, Bu=butyl. Combinations of different types of rare earth catalysts may be used in the method.

The polymerization reactions are carried out in the presence of a cocatalyst. Cocatalysts include boranes ($BR'_3$) and borates ($[R_3C]^+[BR'_4]^-$, $[R''_3NH]^+[BR'_4]^-$), wherein R, R', R'' are independently selected from alkyl and aryl groups. R groups may be different. In embodiments, R and R' are each a fluorinated aryl group, for example, a pentafluorophenyl group. Illustrative cocatalysts are shown in FIG. 10. Illustrative cocatalysts also include the borate cocatalysts used in the Example below. Other cocatalysts include tris/tetra (2,2', 2''-nonafluorobiphenyl) borane/borate and tris/tetra-β-perfluoronaphthyl borane/borate. (See Li et al., Organometallics 1998, 3996-4003, which is hereby incorporated by reference in its entirety.)

In embodiments, the polymerization reactions are carried out in the absence of a Lewis acid masking agent, e.g., methylaluminoxane or an aluminum alkyl. Similarly, the polymerization reactions may be carried out in the absence of water and oxygen (under anhydrous/anaerobic conditions).

In embodiments, the polymerization reactions are carried out in the presence of an exogenous Lewis base, e.g., a tertiary amine. This may be useful to modulate the incorporation of amino-olefins and α-olefins as further described in the Example below. Exogenous Lewis bases include $NR_3$, wherein R is a linear alkyl, a branched alkyl, or an aryl. The number of carbon atoms in the alkyl may be in the range of 1 to 10, 1 to 8, or 1 to 6. The three R groups may be different or the same. The alkyl and aryl groups may be substituted or unsubstituted. Illustrative aryl (Ar) groups have been described above. In embodiments, the exogenous Lewis base has Formula 14, $NR_3$, wherein each R is independently selected from $(CR'R'')_nCH_3$ and $(CR'R'')_nAr$, wherein R' and R'' are independently selected from a hydrogen and an alkyl group and n is an integer from 0 to 10. The number of carbon atoms in the alkyl group may be in the range of 1 to 10, 1 to 8, or 1 to 6. The alkyl and aryl groups may be substituted or unsubstituted. Exogenous Lewis bases also include the illustrative ones shown in FIG. 11, having Formulas 15-18. In these formulas, each R is independently selected from H and alkyl groups. The alkyl groups may be linear or branched, substituted or unsubstituted. The number of carbon atoms in the alkyl groups may be in the range of 1 to 6.

Various reactor systems may be used to carry out the present methods, e.g., batch reactors or continuous reactors. The components used in the method may be provided in various media, e.g., liquid media. By way of illustration, the amino-olefin monomer may be provided as a solution comprising the amino-olefin monomer and a solvent, e.g., a hydrocarbon solvent. The rare earth catalyst/cocatalyst may be similarly provided as a solution. Gaseous olefins may be provided as a pure gas.

The conditions which induce polymerization reactions between the olefin and amino-olefin monomers include the relative concentration of components, the pressure (e.g., for gaseous olefins), the reaction temperature, the reaction time, and the liquid media used. The catalyst concentration may be in the range of 0.000001 M to 2.0 M. The cocatalyst concentration may be in the range of 0.000001 M to 2 M. The pressure for gaseous olefins may be in the range of 0.1 psi to 15000 psi. The α-olefin concentration and amino-olefin concentrations may be in the range of 0.01 M to solvent-free. The reaction temperature may be in the range of −10 to 150° C. The polymerization reactions may be carried out neat or in organic solvents. The organic solvent employed can be an aliphatic alkane or cycloalkane such as pentane, hexane, heptane, cyclohexane or methylcyclohexane (see Example, Table 3); or a hydrogenated aromatic compound, such as tetrahydronaphthalene or decahydronaphthalene; or a high molecular weight liquid paraffin or mixture of paraffins which are liquid at reaction temperature; or an aromatic hydrocarbon, such as benzene, toluene, xylene; or halogenated solvents such as fluorobenzene, difluorobenzene or chlorobenzene. These parameters may be adjusted to tune the properties of the copolymer (the polar functionalized polyolefin), e.g., the molecular weight (e.g., number average molecular weight $M_n$), the amount of amino-olefin incorporation, the melting temperature $T_m$, and the water contact angle. These parameters may also be adjusted to achieve a particular (e.g., maximum) yield or activity. Illustrative parameters and techniques for determining each of these properties are provided in the Example below. See also U.S. Provisional Application 62/568,978, which is hereby incorporated by reference in its entirety.

The present methods may further comprise recovering the polar-functionalized polyolefin.

The polar-functionalized polyolefins themselves are also encompassed by the present disclosure. The polar-functionalized polyolefin is a copolymer of any of the described olefins and any of the described amino-olefins. The polar-functionalization polyolefins may be characterized by any of the properties described above. By way of illustration, the polar-functionalized polyolefins may be characterized by one or more of the following: a $M_n$ in the range of from about 1000 to about 5000000 (this includes a range from about 5000 to about 1000000 or from about 10000 to about 500000); amino-olefin incorporation in the range of from about 0.01% to about 12.5% (this includes a range of from about 1% to about 10% or from about 5% to about 8%); $T_m$ in the range of from about 80° C. to about 140° C. (this includes a range of from about 100° C. to about 130° C. or from about 100° C. to about 120° C.); and water contact angle in the range of from about 80° to about 105° (this includes a range of from about 85° to about 100° or from about 90° to about 100°). The method may be characterized by a yield in the range of from about 0.1 g to about 10 g (this includes a range of from about 1 g to about 10 g or from about 5 g to about 10 g), an activity in the range of from about 1.0 to about 550 Kg copolymer/mol-Sc·h·atm (this includes a range of from about 50 to about 350 Kg copolymer/mol-Sc·h·atm or from about 100 to about 250 Kg copolymer/mol-Sc·h·atm) or both.

The polar-functionalized polyolefins may be used as is or may be combined with other components to form a composition (e.g., other polymers including unfunctionalized polyolefins) in order to tune the properties of the composition (e.g., to increase the adhesion, hydrophilicity, and/or antibacterial properties of the composition).

EXAMPLE

Introduction

This Example demonstrates that mono- and binuclear cationic Sc half-sandwich complexes (FIG. 1)[15] are active catalysts for ethylene copolymerization with amino-olefins (AOs) in the absence of masking agents. Mechanistic studies show that these catalysts exhibit distinctive catalytic behaviors in comparison to group[4, 16] and late transition metals,[7b] with generally higher activity and comonomer incorporation than typical $Ni_2$ bisphenoxyiminato catalysts.[17] Correlations between AO linker length (n) and comonomer selectivity support a functional group-assisted enchainment mechanism, with possible binuclear cooperative effects.

EXPERIMENTAL

Materials and Methods

All manipulations of air-sensitive materials were performed with rigorous exclusion of $O_2$ and moisture in oven-dried Schlenk-type glassware on a dual manifold Schlenk line, interfaced to a high-vacuum line ($10^{-6}$ Torr), or in a $N_2$-filled MBraun glove box with a high-capacity recirculator (<1 ppm $O_2$). Argon (Airgas, pre-purified grade) was purified by passage through a supported MnO oxygen-removal column and an activated Davison 4 Å molecular sieve column. Ethylene (Airgas) was purified by passage through an oxygen/moisture trap (Matheson, model MTRP-0042-XX). Hydrocarbon solvents (n-pentane) were dried using activated alumina columns according to the method described by Grubbs (Pangborn, A. B.; Giardello, M. A.; Grubbs, R. H.; Rosen, R. K.; Timmers, F. J., *Organometallics* 1996, 15, 1518-20) and were additionally vacuum-transferred from Na/K alloy immediately before vacuum line manipulations. All solvents for high-vacuum line manipulations were stored in vacuum over Na/K alloy in Teflon-valve sealed bulbs. All other deuterated solvents were used as received (Cambridge Isotope Laboratories, 99+atom % D). Other non-halogenated solvents were dried over Na/K alloy, and halogenated solvents were distilled from $CaH_2$ and stored over activated Davison 4 Å molecular sieves. All reagents other than specified are commercially available and used as received. Mononuclear $[C_5Me_4SiMe_3Sc(CH_2SiMe_3)_2(THF)]$ (Sc1) (Luo, Y.; Baldamus, J.; Hou, Z., *J. Am. Chem. Soc.* 2004, 126, 13910-13911) and binuclear catalysts (Sc—$C_2$—Sc and Sc—$C_0$—Sc) (Chen, J.; Gao, Y.; Xiong, S.; Delferro, M.; Lohr, T. L.; Marks, T. J., *ACS Catal.* 2017, 7, 5214-5219) were synthesized and purified according to the literature.

Purification Procedure of Amino Olefins

Amino-olefins were synthesized and purified according to literature procedures. (Radlauer, M. R.; Buckley, A. K.; Henling, L. M.; Agapie, T., *J. Am. Chem. Soc.* 2013, 135, 3784-3787.) The crude products were fractionally distilled under vacuum to separate the product from solvent, excess starting amine, and non-volatile side products. The clear, colorless AO oils were collected, dissolved in pentane and filtered through a plug of silica gel to further remove traces of the starting amine. The product was obtained as a clear, colorless oil after removing pentane under vacuum. The product was dried by stirring over $CaH_2$ for 48 h, vacuum transferred, and degassed on a high vacuum line. The $^1H$ NMR of the product AOs were identical to the literature. (Radlauer, M. R.; Buckley, A. K.; Henling, L. M.; Agapie, T., *J. Am. Chem. Soc.* 2013, 135, 3784-3787.) The product was then brought into the glovebox and filtered through an alumina plug before use. The alumina had been activated/dried under high vacuum at 170° C. overnight before use.

Physical and Analytical Measurements

NMR spectra were recorded on Varian UNITY Inova-500 (FT, 500 MHz, $^1H$; 125 MHz, $^{13}C$), UNITY Inova-400 (FT, 400 MHz, $^1H$; 100 MHz, $^{13}C$), Agilent DD2-HCN600 (FT, 600 MHz, $^1H$; 150 MHz, $^{13}C$) or Bruker ASCEND-400 (FT, 400.13 MHz, $^1H$; 100.60 MHz, $^{13}C$). Chemical shifts for $^1H$ and $^{13}C$ spectra were referenced using internal solvent resonances and are reported relative to tetramethylsilane (TMS). NMR experiments on air-sensitive samples were conducted in Teflon valve-sealed sample tubes (J-Young). $^1H$ NMR and $^{13}C$ NMR analysis of polymer microstructure were conducted in 1,1,2,2-tetrachloroethane-$d_2$ at 120° C. with delay time $(d_1)$=5 or 10 secs. Gel permeation chromatography (GPC) was carried out in 1,2,4-trichlorobenzene (stabilized with 125 ppm of BHT) at 150° C. on a Polymer Laboratories 220 instrument equipped with a set of three PLgel 10 μm mixed-B columns with differential refractive index, viscosity, and light scattering (15° and 90°) detectors. DSC measurements were performed on a SDT Q600 at a rate of 5° C./min. Any thermal history difference in the polymers was eliminated by first heating the specimen at 20° C./min to 160° C., cooling at 10° C./min to 30° C., and then recording the second DSC scan. Samples for water contact angle measurements were prepared by the evaporation of 1 mg mL$^{-1}$ solutions in 1,2,4-trichlorobenzene onto silicon substrates under 170° C. Water contact angles on polymer films were measured with microscope digital camera (Amscope MU300) and the images were processed by ImageJ software. For each film, at least six measurements were made and the water contact angles of the polymer thin films have an accuracy of ±2°.

General Ethylene/AO Copolymerization Procedures

In a typical experiment, a 150 mL glass pressure vessel equipped with stir bar (dried in an oven overnight prior to use) was loaded with 10 mL of toluene and AO (and N"Pr$_3$ when stated), taken out of the glovebox and attached to a high vacuum line. The mixture was cooled to −78° C. in a dry ice/acetone bath and degassed, then allowed to warm up to 25° C. with an external water bath. The mixture was then magnetically stirred rapidly under 1 atm of ethylene, and 10 mL of catalyst/cocatalyst solution was quickly injected into the rapidly stirred flask using a gas-tight syringe equipped with a flattened spraying needle. After a measured time interval, the reaction was stopped by introducing 10 mL of methanol; the reactor was then vented and additional methanol was added to the polymerization mixture to precipitate polymer. The precipitated polymer was stirred for several hours, filtered, washed with methanol, and collected. It was then dried under high vacuum at 60° C. overnight until reaching a constant weight.

Data for ethylene homopolymerization mediated by organoscandium catalysts, NMR data and Differential Scanning calorimetry (DSC) data for polymer characterization, data from water contact angle measurements, and data from molecular weight measurements was obtained (data not shown).

Results and Discussion

Figure 2:
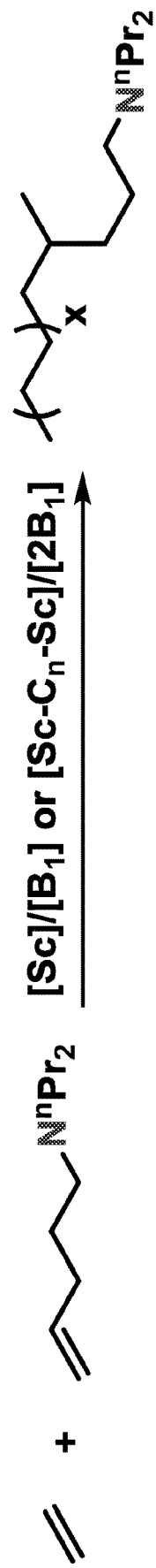
FIG. 2 illustrates a heteropolymerization reaction between ethylene monomer and an amino-olefin monomer mediated by an organoscandium catalyst and cocatalyst.
Figure 3B:
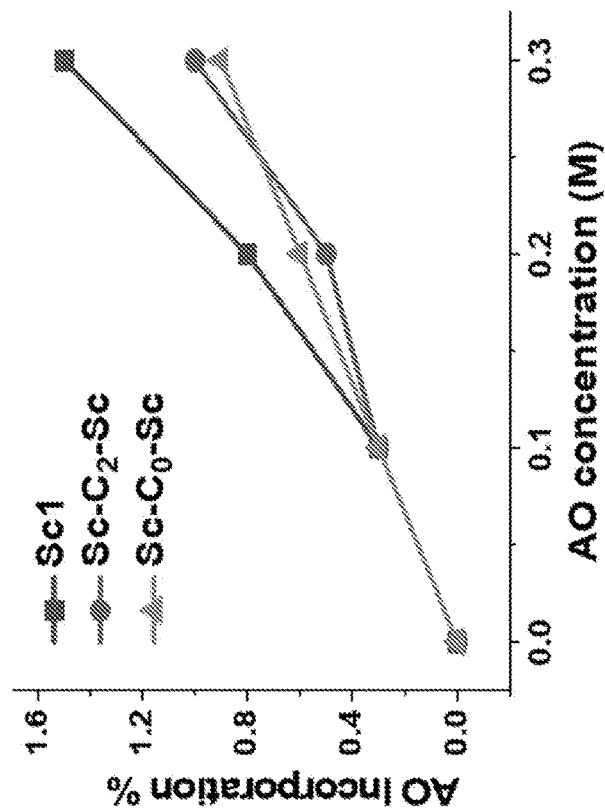
FIG. 3B plots AO incorporation as a function of catalyst and [AO].
Figure 3A:
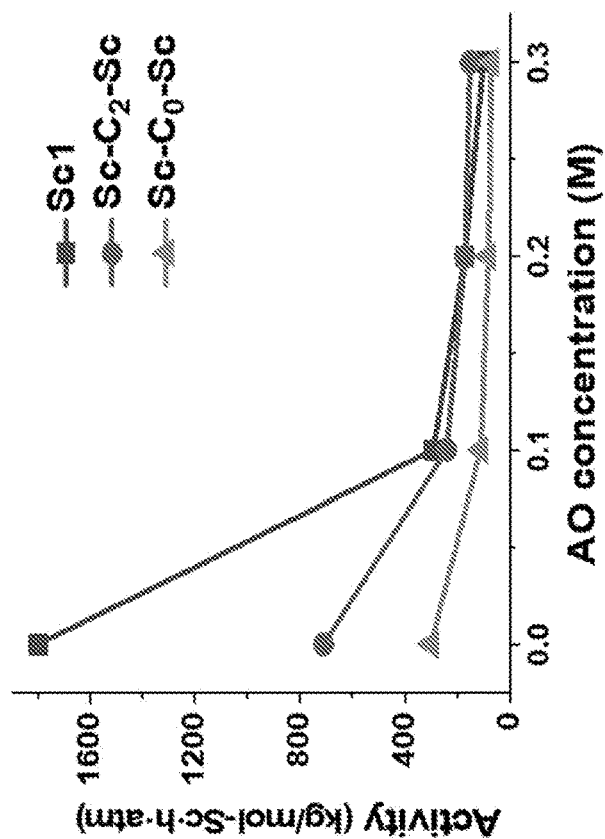
FIG. 3A plots the activity (Kg copolymer/mol-Sc·h·atm) of ethylene+N(pentenyl)"Pr₂ copolymerization as a function of catalyst and concentration of amino-olefin ([AO]).

In this Example, ethylene/N(pentenyl)"Pr$_2$ copolymerizations were first investigated using trityl perfluoroarylborate $(Ph_3C^+)B(C_6F_5)_4^-$ (B$_1$) activated mono-(Sc1) and binuclear (Sc—C$_0$—Sc and Sc—C$_2$—Sc) organoscandium catalysts under rigorously anhydrous/anaerobic conditions with careful attention to mass transfer effects. Results are summarized in Table 1. Up to 0.3% N(pentenyl)"Pr$_2$ incorporation (I) is achieved at 0.1 M [AO] using Sc1 (Table 1 entries 1-3). Increasing the [AO] to 0.3 M results in higher AO incorporation, 1.5%, albeit with somewhat lower activity (Table 1 entries 4 and 5). While the binuclear catalysts exhibit similar or slightly lower AO incorporation versus Sc1 (Table 1 entries 6-11 vs 1-5), significant binuclearity effects are evident by comparing the activities of ethylene homopolymerization and AO copolymerizations over a range of AO concentrations (FIG. 3A). For mononuclear Sc1, polymerization activities fall dramatically in the presence of AO in comparison to that for ethylene homopolymerization, 6.2× at 0.1 M, 18× at 0.3 M AO. In contrast, the activities of binuclear catalysts Sc—C$_2$—Sc and Sc—C$_0$—Sc decrease far more slowly relative to Sc1, 3.0× and 2.7× at 0.1 M, and 4.7× and 4.2× at 0.3 M AO, respectively. The smaller activity drop in percentage indicates that the binuclear catalysts have increased AO tolerance in comparison to the mononuclear Sc1 catalyst.

TABLE 1

Data for ethylene + N(pentenyl)"Pr$_2$ copolymerizations mediated by organoscandium catalysts[a]

| Entry | Catalyst | Comonomer Conc. (M) | Time (min) | Yield (g) | Activity [b] | I (%) [c] | $T_m$ (° C.) [d] | Water Contact Angle (°) [e] |
|---|---|---|---|---|---|---|---|---|
| 1 | Sc1 | 0.1 | 1 | 0.15 | 420 | 0.3 | 126.2 | 98.4 |
| 2 | Sc1 | 0.1 | 5 | 0.52 | 290 | 0.3 | 128.2 | 98.6 |
| 3 | Sc1 | 0.1 | 10 | 0.94 | 270 | 0.3 | 128.7 | 99.0 |
| 4 | Sc1 | 0.2 | 5 | 0.30 | 170 | 0.8 | 126.2 | 97.5 |
| 5 | Sc1 | 0.3 | 5 | 0.18 | 100 | 1.5 | 124.4 | 91.0 |
| 6 | Sc-C$_2$-Sc | 0.1 | 5 | 0.41 | 240 | 0.3 | 128.5 | 100.1 |
| 7 | Sc-C$_2$-Sc | 0.2 | 5 | 0.30 | 170 | 0.5 | 125.4 | 99.3 |
| 8 | Sc-C$_2$-Sc | 0.3 | 5 | 0.26 | 150 | 1.0 | 124.1 | 86.7 |

TABLE 1-continued

Data for ethylene + N(pentenyl)$^n$Pr$_2$ copolymerizations mediated by organoscandium catalysts[a]

| Entry | Catalyst | Comonomer Conc. (M) | Time (min) | Yield (g) | Activity [b] | I (%) [c] | T$_m$ (° C.) [d] | Water Contact Angle (°) [e] |
|---|---|---|---|---|---|---|---|---|
| 9 | Sc-C$_0$-Sc | 0.1 | 5 | 0.19 | 110 | 0.3 | 129.0 | 100.6 |
| 10 | Sc-C$_0$-Sc | 0.2 | 5 | 0.14 | 80 | 0.6 | 126.7 | 90.5 |
| 11 | Sc-C$_0$-Sc | 0.3 | 5 | 0.12 | 71 | 0.9 | 125.3 | 89.1 |

[a] Conditions: 21 μmol Sc1 (10.5 μmol Sc-C$_n$-Sc), 21 μmol B$_1$, 1 atm ethylene, 20 mL toluene, 25° C., Average of 2 runs for each entry. [b] Kg copolymer/mol-Sc · h · atm. [c] Incorporation % determined by $^1$H NMR. [d] By DSC. [e] At least 6 measurements were made for each sample, accuracy ±2°.

Figure 3D:
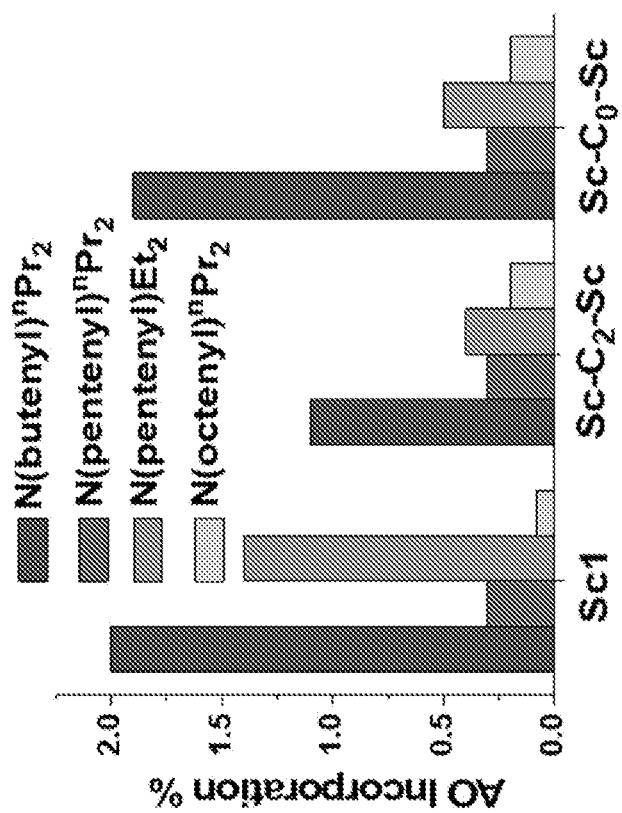
FIG. 3D compares AO incorporation of ethylene+N(alkenyl)"R₂ copolymerization at 0.1 M [AO].
Figure 3C:
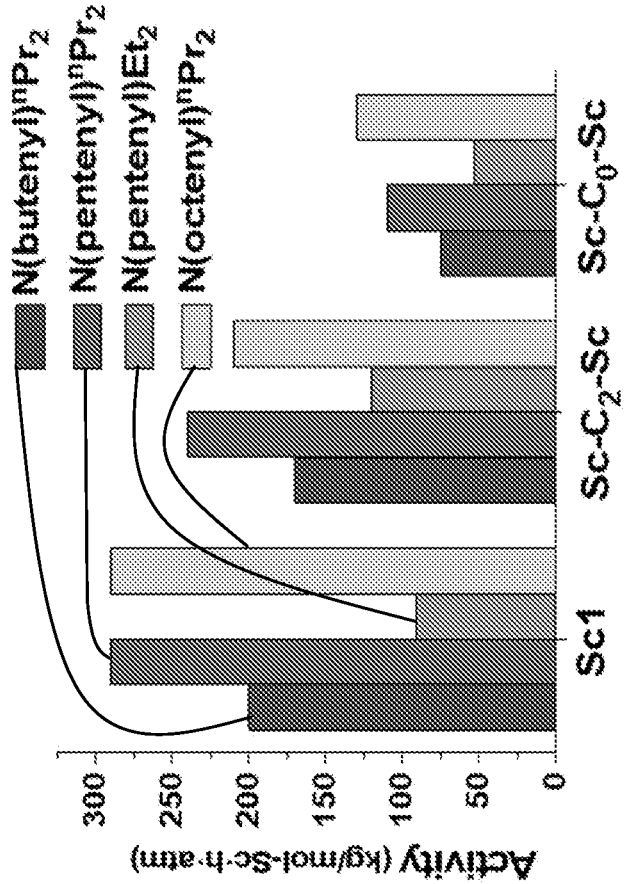
FIG. 3C compares the activity of ethylene+N(alkenyl)"R₂ copolymerization as a function of catalyst.

Ethylene copolymerization with AOs having systematically varied linker lengths (n) and N-alkyl groups were next investigated and results are shown in Table 2 and FIGS. 3C and D. For all catalysts, activity falls in the presence of less sterically hindered amine N(pentenyl)Et$_2$ versus N(pentenyl)$^n$Pr$_2$ (Table 2 entries 1-3 vs Table 1 entries 2, 6, and 9 and FIG. 1C), with binuclear catalysts showing greater functional group tolerance in comparison to Sc1. Notably, Sc—C$_2$—Sc (Table 2 entry 2) exhibits higher activity with N(pentenyl)Et$_2$ than Sc1 (Table 2 entry 1). In terms of AO incorporation, Sc1 incorporates 4× more N(pentenyl)Et$_2$ than N(pentenyl)$^n$Pr$_2$ at the same [AO] (Table 2 entry 1 vs Table 1 entry 2 and FIG. 3D). For the binuclear catalysts, the level of AO incorporation is more uniform, and the linker length (n) does not significantly affect the activity (FIG. 3C). Interestingly, however, the level of AO incorporation depends significantly on n. For AOs with a short linker such as N(butenyl)$^n$Pr$_2$, up to 2.0% comonomer can be incorporated at 0.1 M AO. Increasing the N(butenyl)$^n$Pr$_2$ concentration to 0.2 M leads to more AO incorporation (8.6-12.5%) (Table 2 entries 5 and 7). For the long comonomer N(octenyl)$^n$Pr$_2$, I % is <0.2%. This correlation between shorter linker length and higher incorporation holds for both mono- and binuclear catalysts (FIG. 3D). Note that the binuclear catalysts also incorporate more N(octenyl)$^n$Pr$_2$ than does mononuclear Sc1.

TABLE 2

Ethylene + amino-olefin copolymerization data[a]

| Entry | Catalyst | Comonomer | Activity[b] | I (%)[c] | T$_m$ (° C.)[d] | WaterContact Angle (°)[e] |
|---|---|---|---|---|---|---|
| 1 | Sc1 | N(pentenyl)Et$_2$ | 91 | 1.4 | 124.5 | 88.6 |
| 2 | Sc-C$_2$-Sc | N(pentenyl)Et$_2$ | 120 | 0.4 | 126.0 | 95.2 |
| 3 | Sc-C$_2$-Sc | N(pentenyl)Et$_2$ | 53 | 0.5 | 126.1 | 98.1 |
| 4 | Sc1 | N(butenyl)$^n$Pr$_2$ | 200 | 2.0 | 125.9 | 90.0 |
| 5 | Sc1 | N(butenyl)$^n$Pr$_2$[f] | 100 | 12.5 | 122.9 | 84.7 |
| 6 | Sc-C$_2$-Sc | N(butenyl)$^n$Pr$_2$ | 170 | 1.1 | 125.4 | 92.4 |
| 7 | Sc-C$_2$-Sc | N(butenyl)$^n$Pr$_2$[f] | 77 | 8.6 | 121.9 | 87.2 |
| 8 | Sc-C$_0$-Sc | N(butenyl)$^n$Pr$_2$ | 75 | 1.9 | 125.5 | 88.2 |
| 9 | Sc1 | N(octenyl)$^n$Pr$_2$ | 290 | <0.1 | 130.7 | 101.0 |
| 10 | Sc-C$_2$-Sc | N(octenyl)$^n$Pr$_2$ | 210 | 0.2 | 130.6 | 97.5 |
| 11 | Sc-C$_0$-Sc | N(octenyl)$^n$Pr$_2$ | 130 | 0.2 | 131.6 | 98.9 |

[a] Conditions: 21 μmol Sc1 (10.5 μmol Sc-C$_n$-Sc), 21 μmol B$_1$, 1 atm ethylene, 20 mL toluene, 25° C., 5 min 0.1M comonomer, average of 2 runs for each entry. [b] Kg copolymer/mol-Sc · h · atm. [c] Incorporation % determined by $^1$H NMR. [d] By DSC. [e] At least 6 measurements were made for each sample, accuracy ±2° [f] 0.2M comonomer Diffusion-ordered $^1$H NMR spectroscopy (DOSY) in tetrachloro-ethane-d$_2$ confirms that pendant amine units are incorporated in the present copolymers. Thus, the diffusion coefficient for the NCH$_2$-peaks (δ=3.0 ppm) matches the diffusion coefficient for the CH$_2$-peaks (δ=1.4 ppm) of the polymer backbone. Signals assigned to the AO diad[5b] (δ=40-45 ppm) are absent in the $^{13}$C NMR spectra of the product copolymers, indicating the absence of both AO homopolymer and AO diads in the copolymers. Furthermore, AO homo-polymerizations in the presence of these catalysts exhibit negligible activity under identical reaction conditions.[19] Solvent extraction using acetone further confirms the absence of AO homopolymer in the product.[5b] No homopolyethylene was observed in the product copolymers. Differential scanning calorimetry (DSC) reveals that the copolymer $T_m$ values fall with increasing AO incorporation. Water contact angle measurements suggest AO incorporation modifies the surface properties significantly as the water contact angle decreases from 103° to 85° for high I % copolymers. The GPC[2a] and DOSY[20] were inconclusive in obtaining ethylene+AO copolymer $M_n$s in the present systems (data not shown).

Ethylene copolymerizations with AOs were also carried out in an aliphatic solvent (methylcyclohexane) using organoscandium catalyst Sc1. para-n-octyl-trityl borate ($B_{1,n\text{-}octyl}$; illustrative example 2 in FIG. 10) was used as the cocatalyst instead of $B_1$ because of solubility. The results are summarized in Table 3. Polymerization activities in methylcyclohexane were higher than in toluene (275 vs. 200 and 542 vs. 420). Notably, the comonomer incorporation was also higher in methylcyclohexane. These results highlight the importance of solvent in tuning the catalytic parameters and polymer microstructures.

TABLE 3

Ethylene + amino-olefin copolymerization data in methylcyclohexane[a]

| Entry | Catalyst | Comonomer | Time (min) | Yield (g) | Activity[b] | I (%) [c] |
|---|---|---|---|---|---|---|
| 1 | Sc1 | N(butenyl)″Pr$_2$ | 5 | 0.481 | 275 | 2.2 |
| 2 | Sc1 | N(butenyl)″Pr$_2$ | 1 | 0.190 | 542 | 0.8 |

[a]Conditions: 21 μmol Sc1, 21 μmol $B_{1,n\text{-}octyl}$, 1 atm ethylene, 20 mL methylcyclohexane, 25° C., 0.1M comonomer, Average of 2 runs for each entry. [b]Kg copolymer/mol-Sc · h · atm. [c] Incorporation % determined by $^1$H NMR.

Figure 4:
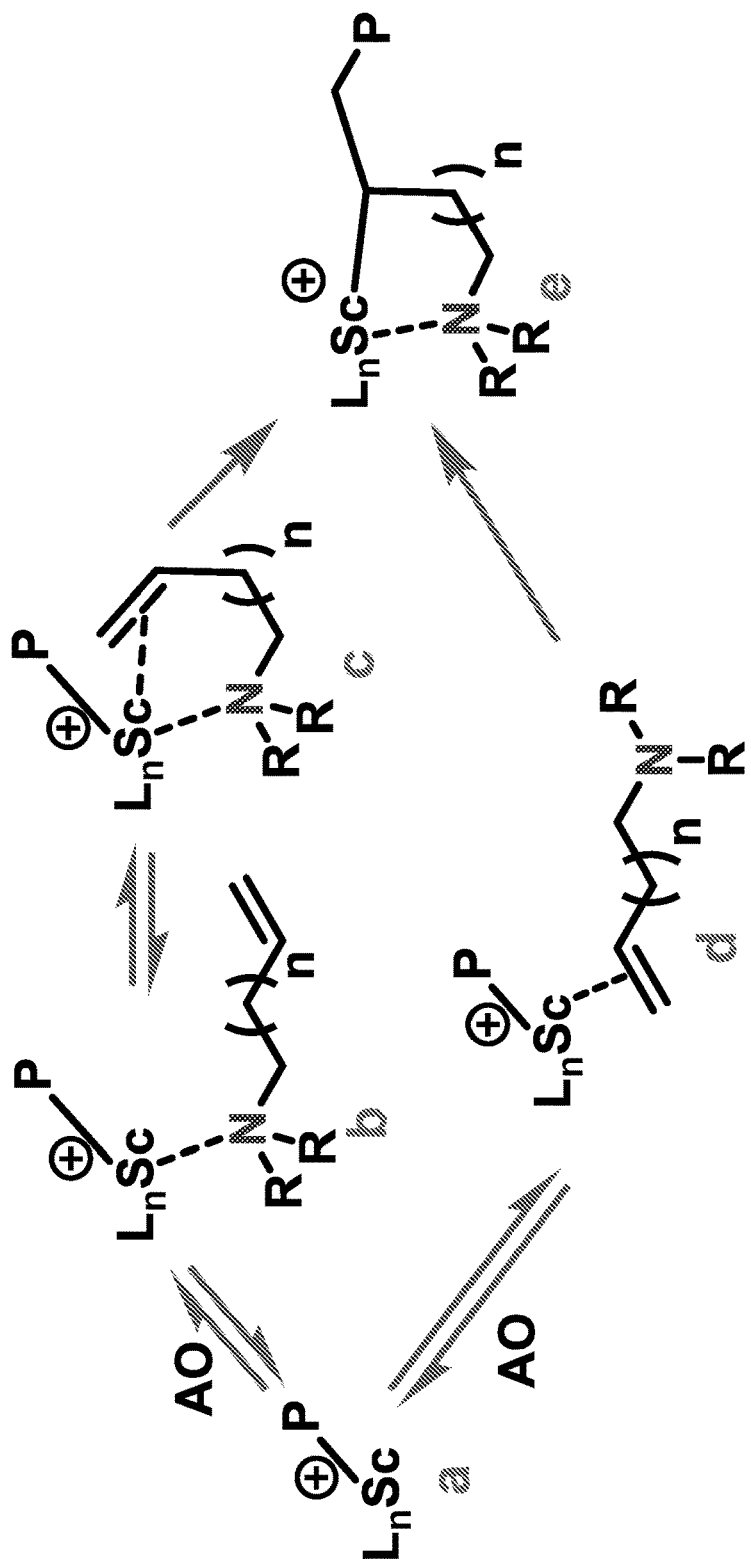
FIG. 4 illustrates coordination and AO enchainment pathways in Sc catalyzed ethylene+AO copolymerization (counteranion omitted for clarity, P=polymer).

As noted above, both the activity and AO incorporation density with the present Sc catalysts are sensitive to the AO structure. Interestingly, comonomers with sterically more encumbered N atoms exhibit higher activity (N″Pr$_2$>NEt$_2$), and the incorporation level (I) inversely tracks the linker length (n) (butenyl>pentenyl>octenyl). From these observations, a functional group-assisted enchainment mechanism is proposed (FIG. 4, pathway A)[21] involving AO amine precoordination to the Sc center (FIG. 4, b). This coordination would reasonably yield a less electrophilic, more sterically hindered Sc center and indeed, the ethylene insertion rates are depressed in comparison to ethylene homopolymerization. And this coordination effect is more pronounced when a less bulky amine is used (NEt$_2$ vs. N″Pr$_2$). Higher [AO] shifts the coordination equilibrium towards the formation of a coordination complex, thus, decreasing the activity. That AO linker length does not influence the activity to the same extent suggests that intramolecular coordination to the cationic Sc center by an inserted AO offsets inhibition to a lesser degree (FIG. 4, e).

AO coordination to the cationic Sc center also brings the AO into close proximity to Sc. Subsequent coordination/activation of the AO C=C bond at the Sc center and the formation of a chelating intermediate may assist AO enchainment at the polymeryl moiety (FIG. 4, pathway A). The effectiveness of the chelation plausibly depends on the pseudo-metallacycle dimensional stability and should follow the approximate order: butenyl>pentenyl>octenyl, which is in accord with the I % levels achieved. DFT studies by Hou also support a similar functional group assisted mechanism with a preference of 2,1-insertion.[18] In the case of N(pentenyl)Et$_2$, higher I % is observed versus N(pentenyl)″Pr$_2$, which can be rationalized by stronger amine binding, reflecting reduced steric encumbrance that facilitates formation of the pseudo-metallocycle. A similar approach was utilized in organolanthanide-catalyzed amino-alkene/amino-diene hydroaminations to modulate activity and selectivity.[22] Note that formation of a chelating intermediate is likely unfavorable in the case of N(octenyl)″Pr$_2$ due to the instability of 10-membered pseudo-metallacycle, consistent with AO I %<0.1% for Sc1. These results suggest that AO enchainment proceeds mainly via an amine-assisted pathway (FIG. 4, pathway A) rather than an unassisted pathway (FIG. 4, pathway B).

Figure 5:
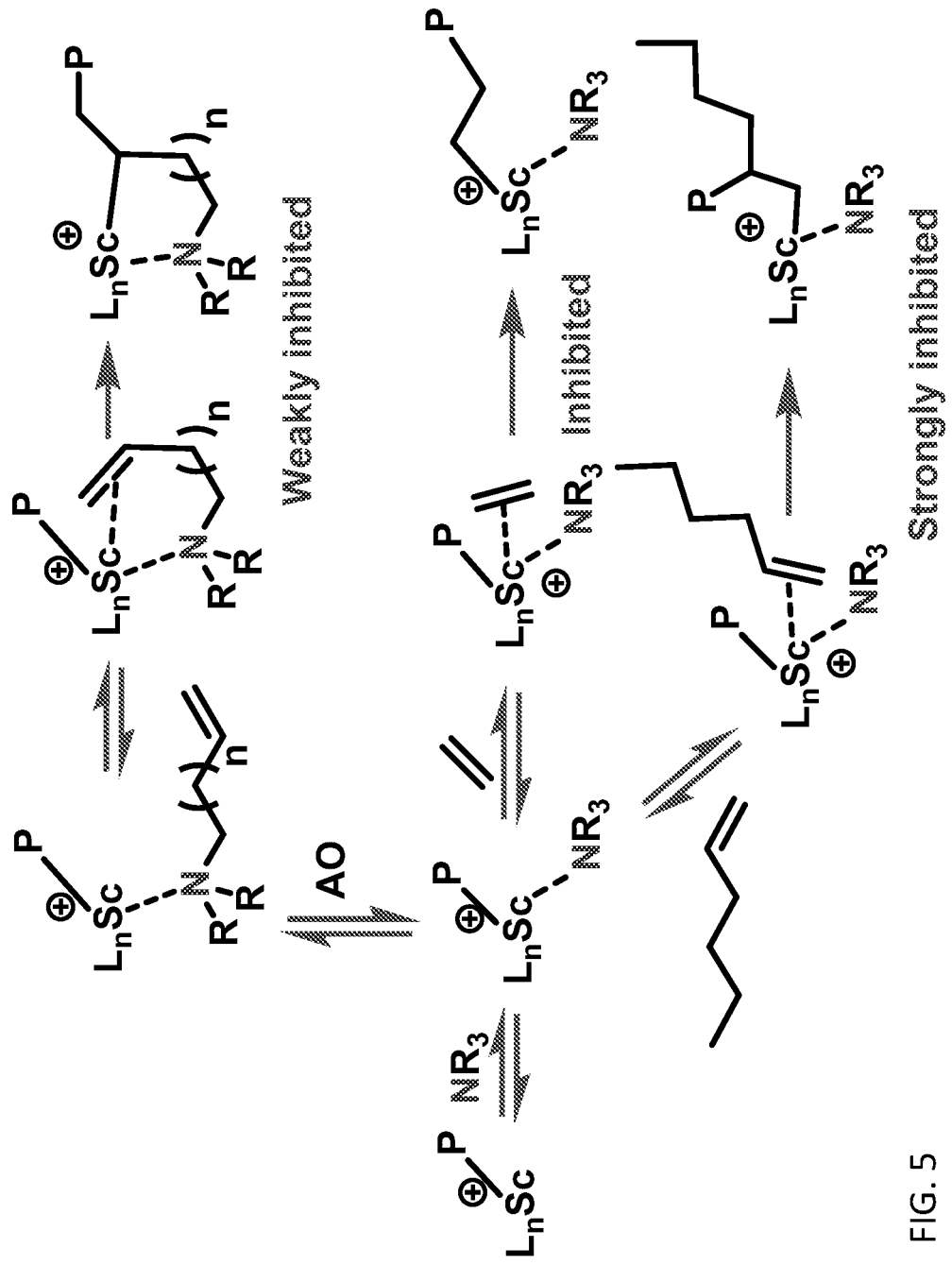
FIG. 5 illustrates scenarios for tertiary amine effects on olefin coordination and enchainment (counteranion omitted for clarity, P=polymer).

To decouple amino-assisted/unassisted incorporation and intra/intermolecular coordination, copolymerizations of ethylene+1-hexene were carried out in the presence of N″Pr$_3$. Introducing 0.1 M N″Pr$_3$ into Sc1-catalyzed ethylene+1-hexene (0.1 M) copolymerizations reduces 1-hexene incorporation in the product copolymers from 4.8% to <0.1%, suggesting that unassisted α-olefin enchainment is strongly inhibited by the amine. Thus, amine-assisted incorporation is major in the present system. N″Pr$_3$ and N(alkenyl)″Pr$_2$ inhibit activity similarly, suggesting that intermolecular amine coordination is the major inhibition mechanism. Furthermore, introducing 0.1 M N″Pr$_3$ into ethylene+N(butenyl)″Pr$_2$ (0.1 M AO) copolymerization reduces activity to 60 kg/mol-Sc·h·atm, but appreciably increases AO incorporation (3.5%). The reduced activity likely reflects weakly coordinated N″Pr$_3$ inhibition of ethylene coordination/activation and subsequent enchainment. Although AO coordination to Sc would most likely be in equilibrium with free N″Pr$_3$, subsequent C=C coordination and insertion should be an intramolecular process, so that the AO insertion rate should not be significantly affected by N″Pr$_3$ (FIG. 5). These results show that exogenous amines may be utilized to modulate comonomer incorporation during polymerizations.

Figure 6:
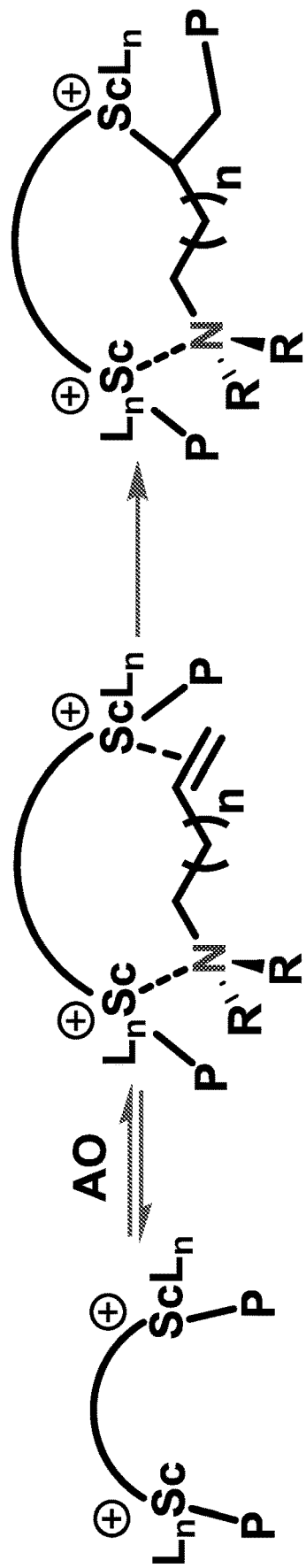
FIG. 6 illustrates a cooperative enchainment pathway for long-linker amino-olefins at binuclear catalysts (anions omitted for clarity, P=polymer).

Finally, the binuclear Sc catalysts are notable for their enhanced functional group tolerance. The activities in ethylene homopolymerization scale as: Sc1>Sc—C$_2$—Sc>Sc—C$_0$—Sc (data not shown), likely reflecting the steric bulk around the two Sc centers in the bimetallic systems.[14] Such steric hindrance may weaken the coordination of amine in ethylene+AO copolymerizations while maintaining a relatively high ethylene insertion rate; this may afford increased overall AO tolerance accompanied by slightly less effective amino-assisted incorporation for short chain AOs. Note also that binuclear catalysts incorporate higher levels of N(octenyl)″Pr$_2$ than Sc1 (Table 2 entries 9-11, FIG. 3D), suggesting another incorporation pathway in addition to the functional group-assisted mechanism (FIG. 4, pathway A). Specifically, after initial amine coordination to the cationic Sc center, an AO olefinic moiety of sufficient linker length may efficiently enchain at the other proximate cationic Sc center of a binuclear catalyst (FIG. 6).[23] This effect would only operate for the longer linker length N(octenyl)″Pr$_2$, and is consistent with the increased AO I %.

CONCLUSION

In conclusion, these results demonstrate that organo-Sc-catalyzed ethylene+amino-olefin (AO) copolymerizations proceed with appreciable activity and AO incorporation levels in the absence of sacrificial Lewis acid masking agents. Linker length-dependent AO enchainment patterns and other mechanistic probes support an unusual amino functional group-assisted enchainment pathway. Binuclear catalyst-mediated copolymerization rates are less sensitive to variations in AO concentration, and comonomer incorporation patterns at large linker lengths implicate bimetallic cooperative enchainment effects.

REFERENCES

[1] a) M. Stuerzel, S. Mihan, R. Muelhaupt, *Chem. Rev.* 2016, 116, 1398; b) P. D. Hustad, *Science* 2009, 325, 704.

[2] a) M. Zhang, X. Yuan, L. Wang, T. C. M. Chung, T. Huang, W. de Groot, *Macromolecules* 2014, 47, 571; b) T. C. M. Chung, *Macromolecules* 2013, 46, 6671; c) N. M. G. Franssen, J. N. H. Reek, B. de Bruin, *Chem. Soc. Rev.* 2013, 42, 5809.

[3] L. S. Boffa, B. M. Novak, *Chem. Rev.* 2000, 100, 1479.

[4] a) X.-H. Yang, C.-R. Liu, C. Wang, X.-L. Sun, Y.-H. Guo, X.-K. Wang, Z. Wang, Z. Xie, Y. Tang, *Angew. Chem., Int. Ed.* 2009, 48, 8099; *Angew. Chem.* 2009, 121, 8243; b) H. Terao, S. Ishii, M. Mitani, H. Tanaka, T. Fujita, *J. Am. Chem. Soc.* 2008, 130, 17636.

[5] a) U. M. Stehling, K. M. Stein, D. Fischer, R. M. Waymouth, *Macromolecules* 1999, 32, 14; b) U. M. Stehling, K. M. Stein, M. R. Kesti, R. M. Waymouth, *Macromolecules* 1998, 31, 2019; c) M. R. Kesti, G. W. Coates, R. M. Waymouth, *J. Am. Chem. Soc.* 1992, 114, 9679.

[6] a) B. P. Carrow, K. Nozaki, *Macromolecules* 2014, 47, 2541; b) A. Nakamura, T. M. J. Anselment, J. Claverie, B. Goodall, R. F. Jordan, S. Mecking, B. Rieger, A. Sen, P. W. N. M. van Leeuwen, K. Nozaki, *Acc. Chem. Res.* 2013, 46, 1438; c) A. Nakamura, S. Ito, K. Nozaki, *Chem. Rev.* 2009, 109, 5215; d) S. D. Ittel, L. K. Johnson, M. Brookhart, *Chem. Rev.* 2000, 100, 1169.

[7] a) M. Li, X. Wang, Y. Luo, C. Chen, *Angew. Chem.*, Int. Ed. 2017, 56, 11604; *Angew. Chem.* 2017, 129, 11762; b) M. Chen, C. Chen, *ACS Catal.* 2017, 7, 1308; c) Y. Ota, S. Ito, M. Kobayashi, S. Kitade, K. Sakata, T. Tayano, K. Nozaki, *Angew. Chem.*, Int. Ed. 2016, 55, 7505; *Angew. Chem.* 2016, 128, 7631; d) Z. Jian, S. Mecking, *Angew. Chem.*, Int. Ed. 2015, 54, 15845; *Angew. Chem.* 2015, 127, 16071; e) C. Chen, S. Luo, R. F. Jordan, *J. Am. Chem. Soc.* 2010, 132, 5273; f) T. R. Younkin, E. F. Connor, J. I. Henderson, S. K. Friedrich, R. H. Grubbs, D. A. Bansleben, *Science* 2000, 287, 460; g) L. K. Johnson, S. Mecking, M. Brookhart, *J. Am. Chem. Soc.* 1996, 118, 267.

[8] a) Z. Wang, D. Liu, D. Cui, *Macromolecules* 2016, 49, 781; b) D. Liu, C. Yao, R. Wang, M. Wang, Z. Wang, C. Wu, F. Lin, S. Li, X. Wan, D. Cui, *Angew. Chem.*, Int. Ed. 2015, 54, 5205; *Angew. Chem.* 2015, 127, 5294; c) D. Liu, R. Wang, M. Wang, C. Wu, Z. Wang, C. Yao, B. Liu, X. Wan, D. Cui, *Chem. Commun.* 2015, 51, 4685.

[9] a) X. Shi, M. Nishiura, Z. Hou, *J. Am. Chem. Soc.* 2016, 138, 6147; b) X. Shi, M. Nishiura, Z. Hou, *Angew. Chem., Int. Ed.* 2016, 55, 14812; *Angew. Chem.* 2016, 128, 15032; c) G. Song, G. Luo, J. Oyamada, Y. Luo, Z. Hou, *Chem. Sci.* 2016, 7, 5265; d) M. Nishiura, F. Guo, Z. Hou, *Acc. Chem. Res.* 2015, 48, 2209.

[10] a) A. M. Kawaoka, T. J. Marks, *J. Am. Chem. Soc.* 2005, 127, 6311; b) A. M. Kawaoka, T. J. Marks, *J. Am. Chem. Soc.* 2004, 126, 12764.

[11] a) S. B. Amin, S. Seo, T. J. Marks, *Organometallics* 2008, 27, 2411; b) S. B. Amin, T. J. Marks, *J. Am. Chem. Soc.* 2007, 129, 10102.

[12] A. Yamamoto, M. Nishiura, J. Oyamada, H. Koshino, Z. Hou, *Macromolecules* 2016, 49, 2458.

[13] S. B. Amin, T. J. Marks, *Angew. Chem.*, Int. Ed. 2008, 47, 2006; *Angew. Chem.* 2008, 120, 2034.

[14] a) M. Fustier, X. F. Le Goff, M. Lutz, J. C. Slootweg, N. Mézailles *Organometallics* 2015, 34, 63; b) S. T. Liddle, D. P. Mills, A. J. Wooles, *Chem. Soc. Rev.* 2011, 40, 2164; c) M. Fustier, X. F. Le Goff, P. Le Floch, N. Mézailles, *J. Am. Chem. Soc.* 2010, 132, 13108

[15] J. Chen, Y. Gao, S. Xiong, M. Delferro, T. L. Lohr, T. J. Marks, *ACS Catal.* 2017, 7, 5214.

[16] a) X. Wang, Y. Wang, X. Shi, J. Liu, C. Chen, Y. Li, *Macromolecules* 2014, 47, 552; b) Z. Chen, J.-F. Li, W.-J. Tao, X.-L. Sun, X.-H. Yang, Y. Tang, *Macromolecules* 2013, 46, 2870.

[17] M. R. Radlauer, A. K. Buckley, L. M. Henling, T. Agapie, *J. Am. Chem. Soc.* 2013, 135, 3784.

[18] C. Wang, G. Luo, M. Nishiura, G. Song, A. Yamamoto, Y. Luo, Z. Hou, *Sci. Adv.* 2017, 3, e1701011.

[19] Hou et al. reported the homopolymerization of N(butenyl)Ph2 catalyzed by Sc catalysts exhibit low activity (37-64% conversion after 24 hours). For details, see ref 18.

[20] W. Li, H. Chung, C. Daeffler, J. A. Johnson, R. H. Grubbs, *Macromolecules* 2012, 45, 9595.

[21] a) D. Liu, M. Wang, Z. Wang, C. Wu, Y. Pan, D. Cui, *Angew. Chem.*, Int. Ed. 2017, 56, 2714; *Angew. Chem.* 2017, 129, 2758; b) H. Leicht, I. Goettker-Schnetmann, S. Mecking, 2017, 139, 6823.

[22] S. Hong, T. J. Marks, *Acc. Chem. Res.* 2004, 37, 673.

[23] For an example of linker length dependent effect in binuclear catalysts, see: S. B. Amin, T. J. Marks, *J. Am. Chem. Soc.* 2007, 129, 2938.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. A method for forming a polar-functionalized polyolefin, the method comprising contacting an unsubstituted α-olefin monomer and an amino-olefin monomer of formula $H_2C=CH(CH_2)_2(CHR)_mNR'_2$, wherein R is H or an unsubstituted linear or branched alkyl group having from 1 to 10 carbons, each R' is an independently selected unsubstituted linear or branched alkyl group having from 1 to 10 carbons, m is an integer from 0 to 11, and n is an integer from 1 to 11, in the presence of a rare earth catalyst and a cocatalyst under conditions to induce a heteropolymerization reaction between the unsubstituted α-olefin and amino-olefin monomers to provide a polar-functionalized polyolefin.

2. The method of claim 1, wherein the amino-olefin monomer has formula $H_2C=CH(CH_2)_nNR'_2$, wherein each R' is an independently selected unsubstituted linear or branched alkyl group having from 1 to 10 carbons and n is an integer from 1 to 11.

3. The method of claim 1, wherein each R' group of the amino-olefin monomer is the same.

4. The method of claim 2, wherein the alkyl group of the amino-olefin monomer is a linear alkyl group.

5. The method of claim 1, wherein the unsubstituted α-olefin monomer is of formula $H_2C\!=\!CHR$, wherein R is selected from H and $(CH_2)_nCH_3$, wherein n is an integer between 0 and 10.

6. The method of claim 1, wherein the unsubstituted α-olefin monomer is ethylene.

7. The method of claim 1, wherein the rare earth catalyst is selected from a group consisting of a mononuclear organoscandium catalyst, a binuclear organoscandium catalyst, a mononuclear organoyttrium catalyst, a binuclear organoyttrium catalyst, a mononuclear organoytterbium catalyst, a binuclear organoytterbium catalyst a mononuclear organolutetium catalyst, a binuclear organolutetium catalyst, and combinations thereof.

8. The method of claim 7, wherein the rare earth catalyst is of Formula 6 or Formula 7,

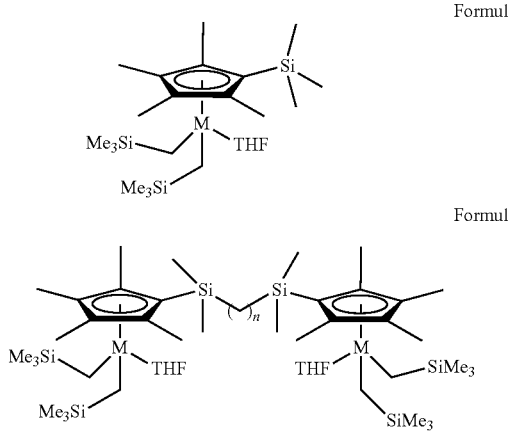

wherein M is selected from Sc, Y, Yb, and Lu and n is 0 or 2.

9. The method of claim 8, wherein M is selected from Sc, Y, and Yb.

10. The method of claim 9, wherein the rare earth catalyst is of Formula 6.

11. The method of claim 10, wherein M is Sc.

12. The method of claim 1, wherein the heteropolymerization reaction is carried out in the presence of an exogenous Lewis base.

13. The method of claim 12, wherein the exogenous Lewis base is a tertiary amine.

14. A method for forming a polar-functionalized polyolefin, the method comprising contacting an olefin monomer of formula $H_2C\!=\!CHR$, wherein R is selected from H and $(CH_2)_nCH_3$, wherein n is an integer between 0 and 10, and an amino-olefin monomer of formula $H_2C\!=\!CH(CH_2)_n NR'_2$, wherein each R' is the same linear, unsubstituted alkyl group having from 1 to 10 carbons and n is an integer from 1 to 11, in the presence of a rare earth catalyst and a cocatalyst under conditions to induce a heteropolymerization reaction between the olefin and amino-olefin monomers to provide a polar-functionalized polyolefin, wherein the rare earth catalyst is of Formula 6 or Formula 7,

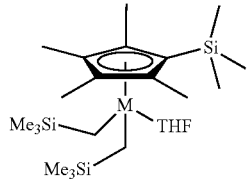

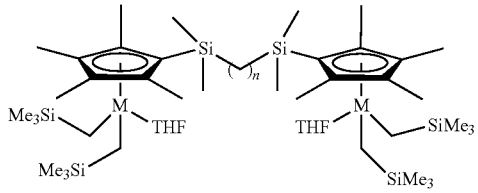

wherein M is selected from Sc, Y, Yb, and Lu and n is 0 or 2.

15. The method of claim 14, wherein the olefin monomer is ethylene.

16. The method of claim 14, wherein M is selected from Sc, Y, and Yb.

17. The method of claim 16, wherein the rare earth catalyst is of Formula 6.

18. The method of claim 17, wherein M is Sc.

19. The method of claim 14, wherein the heteropolymerization reaction is carried out in the presence of an exogenous Lewis base.

20. The method of claim 19, wherein the exogenous Lewis base is a tertiary amine.

* * * * *